US009495323B2

(12) United States Patent
Yost et al.

(10) Patent No.: US 9,495,323 B2
(45) Date of Patent: *Nov. 15, 2016

(54) COPYING DATA ONTO AN EXPANDABLE MEMORY

(71) Applicant: Microsoft Corporation, Redmond, WA (US)

(72) Inventors: Karl Steven Yost, Palo Alto, CA (US); Jaigak Song, Palo Alto, CA (US); Justin Middleton, Palo Alto, CA (US); Scott Zimmerman, Palo Alto, CA (US); Steve Hales, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/757,577

(22) Filed: Feb. 1, 2013

(65) Prior Publication Data

US 2013/0151644 A1      Jun. 13, 2013

Related U.S. Application Data

(63) Continuation of application No. 12/069,884, filed on Feb. 12, 2008, now Pat. No. 8,370,519.

(51) Int. Cl.
| | |
|---|---|
| *G06F 15/167* | (2006.01) |
| *H04L 29/08* | (2006.01) |
| *H04W 99/00* | (2009.01) |
| *H04M 1/2745* | (2006.01) |

(52) U.S. Cl.
CPC ............ *G06F 15/167* (2013.01); *H04L 67/06* (2013.01); *H04W 99/00* (2013.01); *H04L 67/2828* (2013.01); *H04M 1/274516* (2013.01); *H04M 2250/64* (2013.01)

(58) Field of Classification Search
USPC .................. 709/232, 212, 248; 707/621, 622
See application file for complete search history.

(56) References Cited

U.S. PATENT DOCUMENTS

| | | | |
|---|---|---|---|
| 6,993,618 B2 * | 1/2006 | Chen et al. .................. 710/305 |
| 7,533,349 B2 | 5/2009 | Saul et al. | |
| 7,546,353 B2 | 6/2009 | Hesselink et al. | |
| 7,693,949 B2 | 4/2010 | Peacock | |
| 7,739,410 B2 | 6/2010 | Freedman | |
| 7,917,572 B2 * | 3/2011 | Sakuma et al. .............. 709/201 |
| 7,966,355 B2 * | 6/2011 | Sherman et al. ............ 707/824 |
| 8,370,519 B2 | 2/2013 | Yost | |
| RE44,052 E * | 3/2013 | Kim et al. .................... 711/103 |
| 2002/0120696 A1 | 8/2002 | Mousseau et al. | |
| 2002/0163780 A1 | 11/2002 | Christopher | |
| 2003/0028733 A1 * | 2/2003 | Tsunoda et al. ............. 711/154 |
| 2004/0103174 A1 | 5/2004 | Balducci et al. | |
| 2004/0204085 A1 | 10/2004 | Vargas et al. | |

(Continued)

OTHER PUBLICATIONS

"Final Office Action", U.S. Appl. No. 12/069,884, (Dec. 9, 2010), 15 pages.

(Continued)

*Primary Examiner* — Duyen Doan
(74) *Attorney, Agent, or Firm* — Sung Kim; Andrew Sanders; Micky Minhas

(57) ABSTRACT

This document describes a method for synchronizing files on an expandable memory card coupled to a first computing device with an application running on a second computing device, where downloading of files is performed wirelessly without user involvement.

14 Claims, 10 Drawing Sheets

(56) References Cited

U.S. PATENT DOCUMENTS

| | | |
|---|---|---|
| 2005/0147130 A1* | 7/2005 | Hurwitz et al. ............ 370/503 |
| 2005/0203976 A1 | 9/2005 | Hyun et al. |
| 2006/0188864 A1 | 8/2006 | Shah |
| 2006/0259521 A1* | 11/2006 | Armenta et al. ............ 707/201 |
| 2007/0043867 A1* | 2/2007 | Shigeta ........................ 709/226 |
| 2007/0288484 A1 | 12/2007 | Yan et al. |
| 2007/0288551 A1 | 12/2007 | Sidon |
| 2008/0214215 A1 | 9/2008 | Aaltonen et al. |
| 2009/0011747 A1 | 1/2009 | Wood et al. |
| 2009/0011793 A1* | 1/2009 | Pocrass ....................... 455/556.1 |
| 2009/0063711 A1* | 3/2009 | Finkelstein ..................... 710/3 |
| 2009/0100149 A1 | 4/2009 | Arnold et al. |
| 2009/0204721 A1 | 8/2009 | Yost |

OTHER PUBLICATIONS

"Final Office Action", U.S. Appl. No. 12/069,884, (Jul. 23, 2010), 14 pages.

"Non-Final Office Action", U.S. Appl. No. 12/069,884, (Mar. 20, 2012), 14 pages.

"Non-Final Office Action", U.S. Appl. No. 12/069,884, (Apr. 1, 2010), 13 pages.

"Non-Final Office Action", U.S. Appl. No. 12/069,884, (Sep. 2, 2010), 14 pages.

"Notice of Allowance", U.S. Appl. No. 12/069,884, (Oct. 2, 2012), 7 pages.

"Supplemental Notice of Allowance", U.S. Appl. No. 12/069,884, (Dec. 5, 2012), 5 pages.

* cited by examiner

COPYING DATA ONTO AN EXPANDABLE MEMORY

RELATED APPLICATION

This application is a continuation of and claims priority under 35 U.S.C. §120 to U.S. patent application Ser. No. 12/069,884, filed on Feb. 12, 2008, the disclosure of which is incorporated by reference herein in its entirety.

BACKGROUND

The use of wireless devices has become an increasingly important part of everyday life. Wireless devices have become popular due to their portability, convenience, and ease of use. Today, wireless devices are used for a myriad of different applications including telephony, email, personal digital assistants (PDAs) as well as a variety of other functions and services. Integrated circuit technology has allowed for the miniaturization of circuits into smaller and smaller form factors, which has enabled additional functionality to be made available on wireless devices. Additionally, decreasing memory sizes have permitted wireless devices to store larger amounts of information. As a result, wireless networks are rapidly expanding bandwidth and services to accommodate this increase in wireless information and functionality.

Wireless devices today are capable of sending and receiving electronic messages as well as performing other personal information management (PIM) functions. For example, many wireless services allow the storage of user-specific information on a user's wireless device such as calendar, contacts, etc. Further, wireless devices are now being used for taking and storing pictures, listening to audio files, and watching video files. The increase in functionality has led to larger file sizes. One limitation of current wireless networks; however, is that wireless networks have limited bandwidth and, since file sizes are becoming larger, it has become increasingly important to manage transmission of information over wireless networks.

Wireless networks can send and receive information at a much lower rate than most wired networks today. This limited bandwidth of wireless networks is due primarily to the range in which wireless devices are operated. Users of wireless devices may be remote to the supporting wireless service, and, depending on the service, the coverage area may be limited in some areas. Because of this, many functions desired by wireless users may require too much bandwidth for practical use. For example, sending and receiving pictures stored on a wireless device may take up to 500 kilobytes (kb) or more of network bandwidth. On many of today's networks, such a bandwidth limitation leads to excessively long download times. This situation becomes even worse for sending and receiving larger files over the wireless network such as audio and video files. Accordingly, what is needed is a method to send and receive large files over a wireless network over time with limited user involvement.

SUMMARY

A method and apparatus implemented over a wireless network is described for copying files stored on an expandable memory of a wireless device onto an application running on a computer desktop where files are automatically transmitted over a data network whenever they are copied into the desktop application. The files are then transmitted to a wireless service where they are transmitted wirelessly, over time, to the wireless device for downloading.

BRIEF DESCRIPTION OF THE DRAWINGS

A better understanding of the described embodiments can be obtained from the following detailed description in conjunctions with the following drawings, in which.

DETAILED DESCRIPTION

Figure 1:
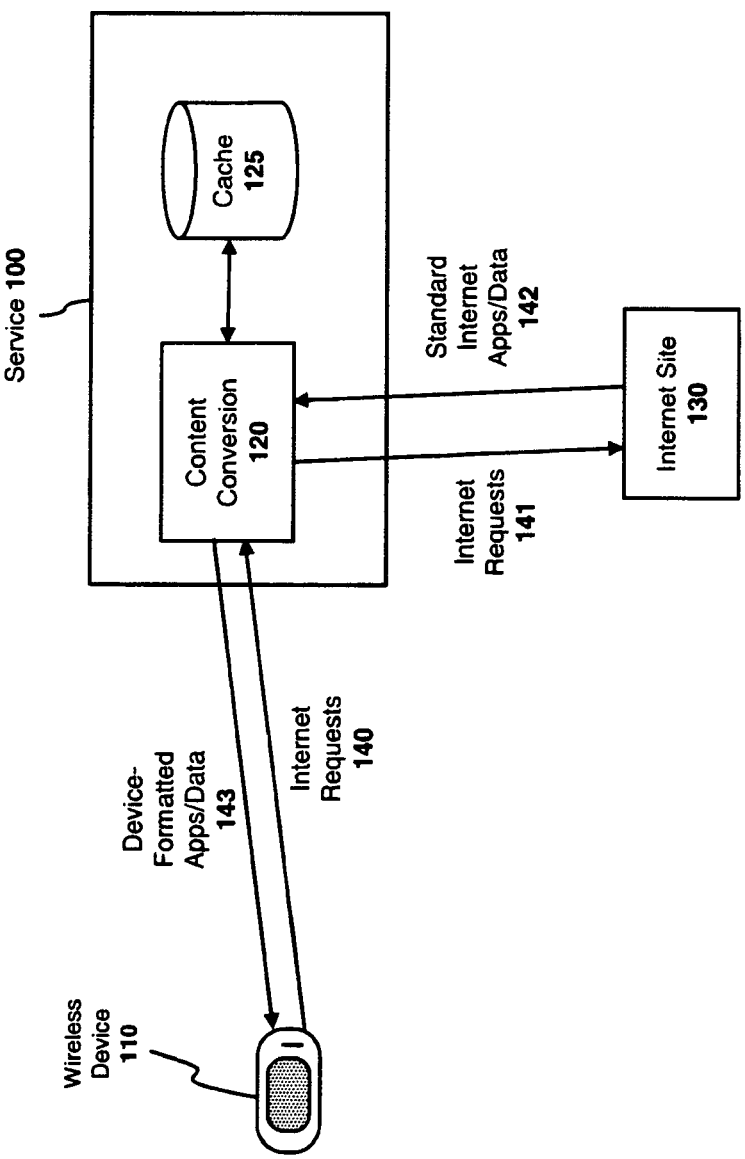
FIG. 1 illustrates a wireless service communicating with a wireless data processing device according to one embodiment.

Throughout the description, for the purposes of explanation, numerous specific details are set forth in order to provide a thorough understanding of the various embodiments described herein. It will be apparent, however, to one skilled in the art that these embodiments may be practiced without some of these specific details. In other instances, well-known structures and devices are shown in block diagram form to avoid obscuring the underlying principles of these embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended to be synonymous with each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed descriptions which follow are presented in terms of algorithms and symbolic representations of operations within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the various embodiments are not described with reference to any particular programming language. It will be appreciated that a variety of programming languages may be used to implement the teachings of the various embodiments described herein.

Embodiments of a Data Processing Service

Various embodiments of copying data onto an expandable memory may be implemented on a wireless device 110 which communicates with a data processing service 100 as illustrated generally in FIG. 1. Embodiments of a service 100 and data processing device 110 are described in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 and an exemplary data processing device 110 will now be described followed by a detailed description of a system and method for copying data onto an expandable memory card in a wireless device over a wireless network using a desktop interface application. As an initial matter, however, it should be noted that the specific data processing device and system architecture described in U.S. Pat. No. 6,721,804 are not required for implementing the underlying principles of the various embodiments described herein. Rather, the embodiments described below may be implemented on virtually any type of data processing device including standard personal computers, personal digital assistants and wireless telephones.

In one embodiment, the service 100 converts standard applications and data into a format which each data processing device 110 can properly interpret. Thus, as illustrated in FIG. 1, one embodiment of the service 110 includes content conversion logic 120 for processing requests for Internet content 140. More particularly, service 100 acts as a proxy for the data processing device 110, forwarding Internet requests 140 and 141 to the appropriate Internet site 130 on behalf of the data processing device 110, receiving responses from the Internet site 130 in a standard Internet format (e.g., web pages with embedded audio/video and graphical content, e-mail messages with attachments, . . . etc), and converting the standard Internet responses 124 into a format which the data processing device 110 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 110. As described above, in one embodiment, the bytecodes may be Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately for the particular device characteristic, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

Figure 2:
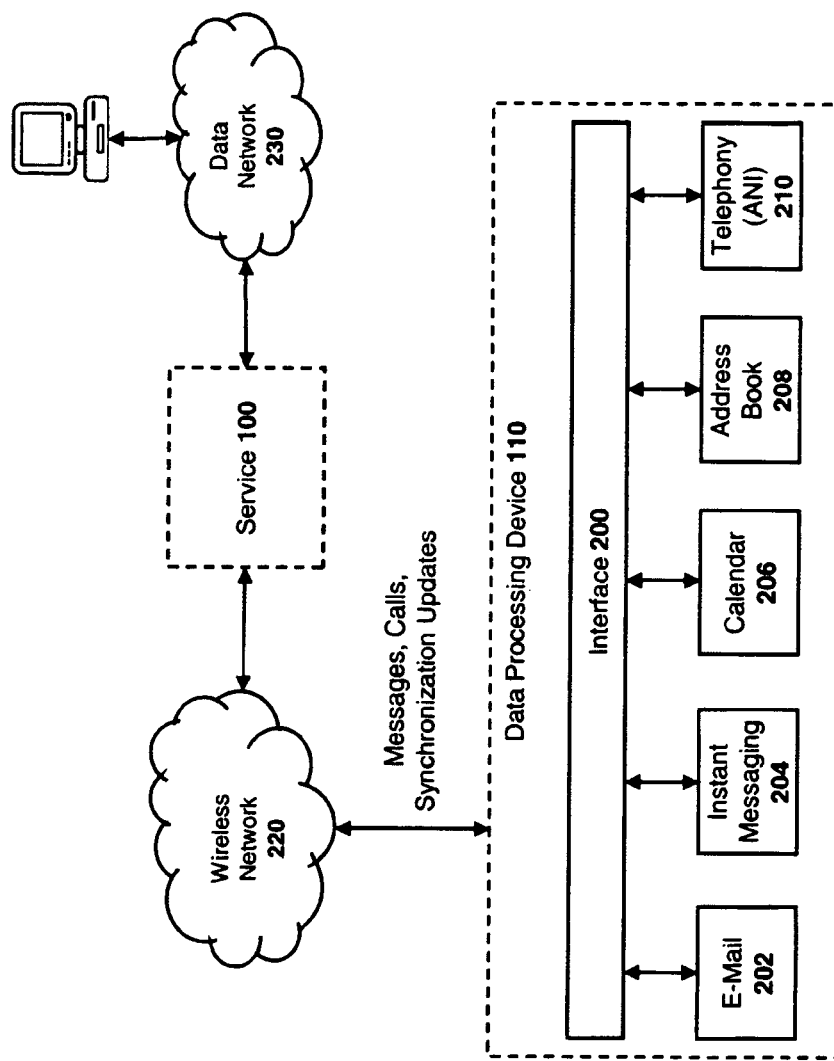
FIG. 2 illustrates a wireless data processing network which may be utilized in one embodiment.

Referring now to FIG. 2 which illustrates a wireless data processing network according to one embodiment. The data processing network includes wireless data processing device 110, wireless network 220, service 100, data network 230 and a user's personal computer (PC). Data network 230 can be any network amenable to sending and receiving packetized information and may include a set of one or more Application Programming Interfaces (APIs) which are a set of routines, protocols and tools that define how service 100 is invoked through a software application such as a Java applet (not shown). Wireless device 110 sends and receives messages, files and other content to and from service 100 through wireless network 220. Wireless device 110 includes interface 200 which provides a conduit between wireless network 220 and the functionality operable on wireless device 110.

Wireless device 110 may include a variety of functions. For example, FIG. 2 illustrates wireless device 110 comprising the following functionality: email 202, instant messaging 204, calendar 206, address book 208, and telephony 210. The various embodiments, however, are not so limited and may include other functionality known in the art such as taking pictures, listening to audio files, watching video files and etc. Service 100 includes electronic circuitry (not shown) that communicates over wireless network 220. Additionally, service 100 includes circuitry (not shown) to communicate over data network 230 to the user's PC. For example, wireless device 110 sends and receives messages, calls, and synchronization updates to wireless service 100 over wireless network 220. Wireless service 100, in turn, transmits this information over data network 230 to the user's PC. This process also works in reverse where information passed from the user's PC to the service over data network 230 is sent to wireless device 110 over wireless network 220. Details of this mechanism are further discussed below.

Figure 3A:
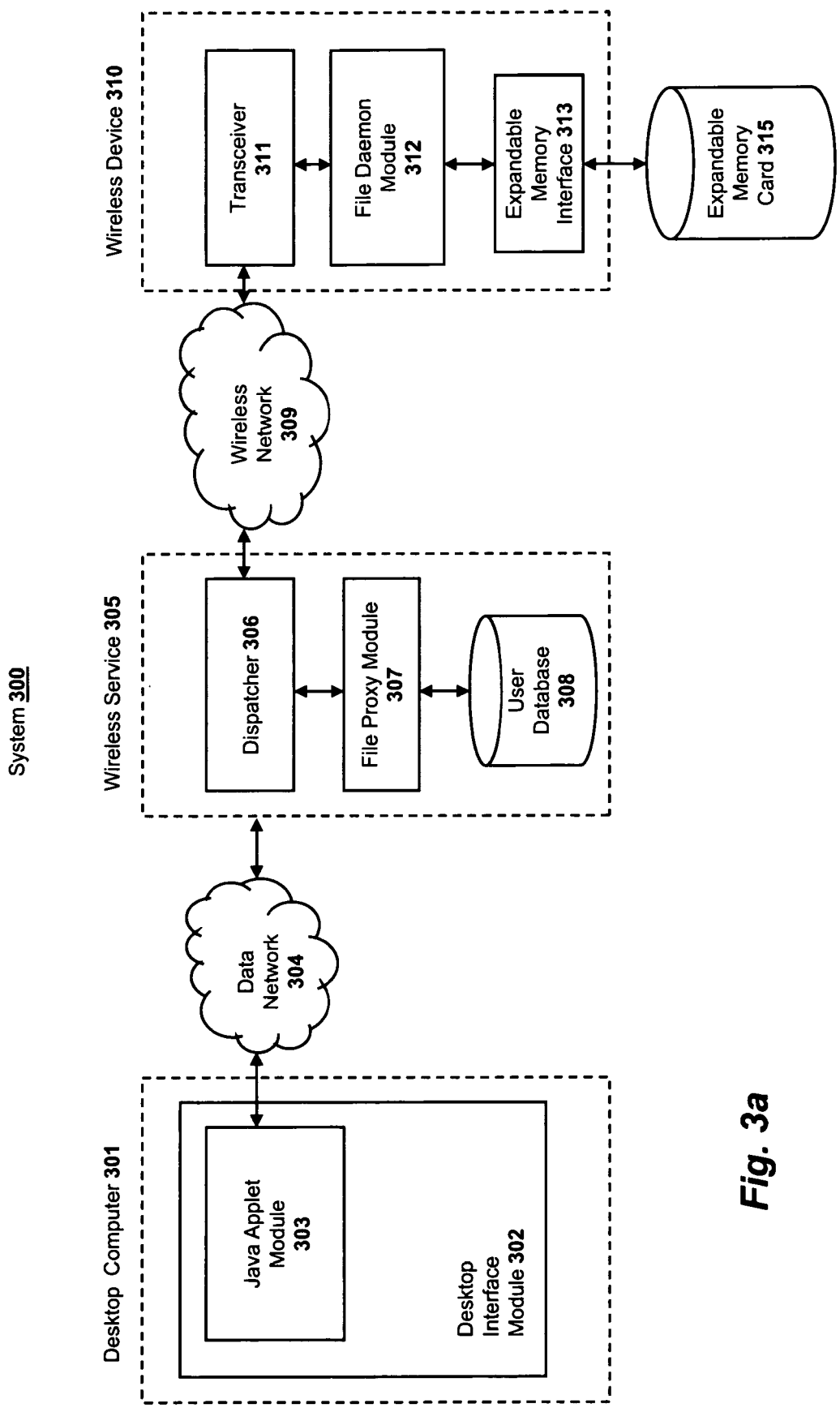
FIGS. 3a-b illustrates a wireless service communicating with both a desktop interface and a wireless device according to one embodiment.

Referring now to FIG. 3a, which illustrates system 300 according to one embodiment. System 300 includes computer desktop 301, data network 304, service 305, wireless network 309, and wireless device 310. In system 300, service 305 communicates with both desktop interface module 302 running on the user's desktop 301 and with the user's wireless device 310. Service 305 includes dispatcher 306, file proxy 307, and user database 308 according to one embodiment. Wireless device 310 includes wireless transceiver 311, file daemon module 312, and expandable memory card 315 coupled to wireless device 310 through expandable memory interface 313. Computer desktop 301 includes desktop interface module 302 and Java applet module 303.

Desktop interface 302, in one embodiment, is a web page running on desktop 301. In this embodiment, desktop interface 302 provides a view onto user database 308 of service 305. For example, user-specific information and other metadata is stored in user database 308 at service 305, and may include such information as calendar, contacts, etc. This information is synchronized with desktop interface 302 so that a user may view the information contained in database 308 using desktop interface 302. Additionally, desktop interface 302 may require a username and password to access service 305 over data network 304.

In one embodiment, information is stored in different locations in wireless device 310. One memory location is in volatile memory built into the device itself (not shown). This memory, like other volatile memories may have faster access times, but any information stored therein will be lost whenever power to the device is shut off. Another memory location is a non-volatile memory such as Flash memory built into the wireless device 310. In one embodiment, the contents of the built-in device memories are synchronized with service 305. Information stored in the device memories, therefore, will always be available on the service 305 and may be accessed via another computing device such as a desktop computer 301.

Another memory location where information is stored on device 310 is on the expandable memory card 315 inserted into device 305 via expandable memory interface 313. In one embodiment, unlike information stored in the built-in memory of the device itself, information stored in expandable memory card 315 is not synchronized with the desktop interface 302. Expandable memory card 315 may be any type of expandable memory known in the art including Secure Digital (SD) cards, microSD cards, ISK3, etc. Information stored in expandable memory card 315 is stored in non-volatile memory which is not lost whenever the device is powered down.

As illustrated in FIG. 3a, in one embodiment, the desktop interface 302 includes a Java applet 303 through which data may be copied onto expandable memory card 315. Java applet 303, in one embodiment, is an application running inside desktop interface 302 on desktop 301, and provides a folder view of files and other data stored on expandable memory card 315 inserted in wireless device 310. The described embodiments, however, are not so limited and may include any application running on user's desktop 301 which may or may not be embedded within desktop interface 302. For example, Java applet 303 may be implemented as a stand-alone Java application. In addition, Java applet 303 is not limited to Java program code and may be any application amenable to running on desktop 301.

From Java applet 303, files may be copied onto expandable memory card 315 and/or onto the built-in non-volatile memory (not shown). As discussed above, in one embodiment, Java applet 303 includes a folder view of the data stored on expandable memory card 315. One embodiment of the folder view is illustrated in FIGS. 5-8. The folder view provides a window in which to copy files that the user desires to have loaded onto expandable memory card 315 and/or the built-in non-volatile memory). Any type of files may be copied into the folder view of Java applet module 303 including data, PDF, pictures, music, video files, etc. In one embodiment, files may be copied into Java applet 303 by dragging and dropping file identifiers using a screen pointer control device such as a mouse (not shown) from a location on desktop 301 into the folder view of Java applet 303. The file identifiers may include icons, filenames, or other identifiers known in the art. The file identifiers may be stored in one or more other folders located on desktop 301. Once a file identifier corresponding to a file located on the user's desktop is copied into the folder view of Java applet 303 running on desktop 301 (or within desktop interface 301 running on desktop 301) it is automatically transmitted over data network 230 to service 100.

Figure 3B:
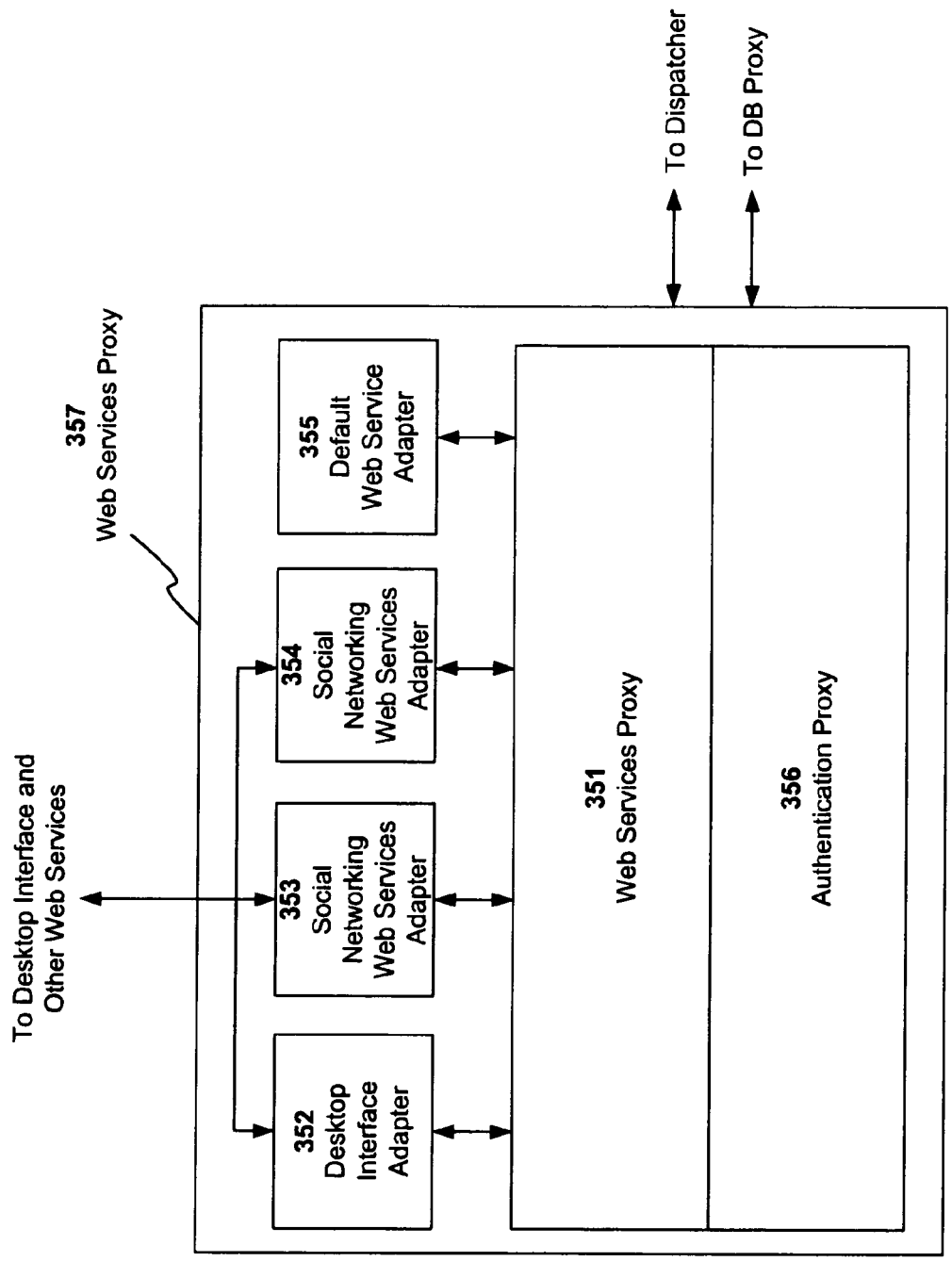

In one embodiment, the desktop interface module 302 is linked to the service 100 through an adapter-based Web services interface such as the one described in the co-pending U.S. application entitled SYSTEM AND METHOD FOR MANAGING WEB SERVICES DATA AND PRESENCE DATA RELATED TO A PLURALITY OF USERS, Ser. No. 12/069,970, Filed Feb. 13, 2008, which is assigned to the assignee of the present application and which is incorporated herein by reference. In particular, as illustrated in FIG. 3b, in one embodiment, the desktop interface module 302 and Java applet 303 communicate with the service through a desktop interface adapter 352. FIG. 3b also illustrates one embodiment of the Web Service integration proxy 207 employed within the service 100. In the illustrated embodiment, the Web Service integration proxy 357 includes a "local" Web Services proxy 351 (i.e., "local" in this sense that it runs on the service 100), a plurality of Web Services adapters 352-355 communicably connected to the Web Services proxy 351, and an authentication proxy 356 for performing the authentication operations described herein.

Certain Web Services exchange information with clients and servers on the Internet using various protocols and encodings, for example the Simple Object Access Protocol (SOAP). SOAP is a message-based protocol which employs an XML syntax to send text commands across the Internet using the Hypertext Transport Protocol (HTTP). Other Web Services protocols such as XML/RPC and REST ("Representational State Transfer") may also be used consistent with the underlying principles of the various embodiments described herein.

Although most Web Services use these standard protocols, many Web Services employs their own specific format (e.g., data schema and rules for communication) which must be followed in order to communicate with those Web services. In addition, each Web service employs its own unique API, i.e., the set of functions and interfaces exposed by the Web service. Thus, in one embodiment, a separate Web Services adapter 352-355 is used to communicate with Web Services proxies and client-based Web services programs (e.g., desktop interface 302) using the formats require by those proxies/programs. In addition, as illustrated in FIG. 3*b*, one embodiment includes a "global" or "default" Web Services adapter 355 for communicating with web services using standardized (i.e., non-proprietary) Web Services communication formats.

The Web Services adapters 352-355 are "plugged in" to the Web Services Proxy 351 through an API exposed by the Web Services Proxy 351. Each of the Web Services adapters 352-355 exchange data and program code with the Web Services Proxy Web Services proxy via this API.

In operation, each adapter 352-355 communicates with a particular Web Service or program (e.g., the desktop interface 302) using the data schema required by that Web service or program. The adapter provides the data to the Web Services proxy 351 via the Web Services proxy API. In one embodiment, the adapter 352-355 may also convert the data into a format interpretable by the Web Services proxy 351. The Web Services proxy 351 extracts the underlying data and encapsulates the data into the communication format required for communicating to the wireless device 310. If the wireless device is currently online, then the dispatcher 306 to which the wireless device 310 is currently connected transmits the data to the wireless device 310 using an asynchronous protocol specifically adapted for transmission over high-latency networks (e.g., wireless networks). For upstream communication, when the user of the wireless device 310 transmits information to the Web Service or program, the information is transmitted through the dispatcher using the same protocol. The Web Services proxy 351 extracts the information and communicates the information to the appropriate Web Services adapter via the Web Service proxy API. The Web Services adapter then communicates the new information to its associated Web Service or program using the required data schema and other communication standards required by the Web Service or program.

One notable benefit of this architecture is that if a particular Web Services proxy or program (e.g., the desktop interface 302) modifies its communication standards/protocol, then only the specific adapter for that web services proxy needs to be modified or replaced. The remaining software executed on the Web Services Proxy 357 and each of the wireless devices 310 does not need to be changed. Thus, the network bandwidth, as well as the engineering time which would normally be required to upgrade each individual wireless device 310 is conserved.

Figure 4:
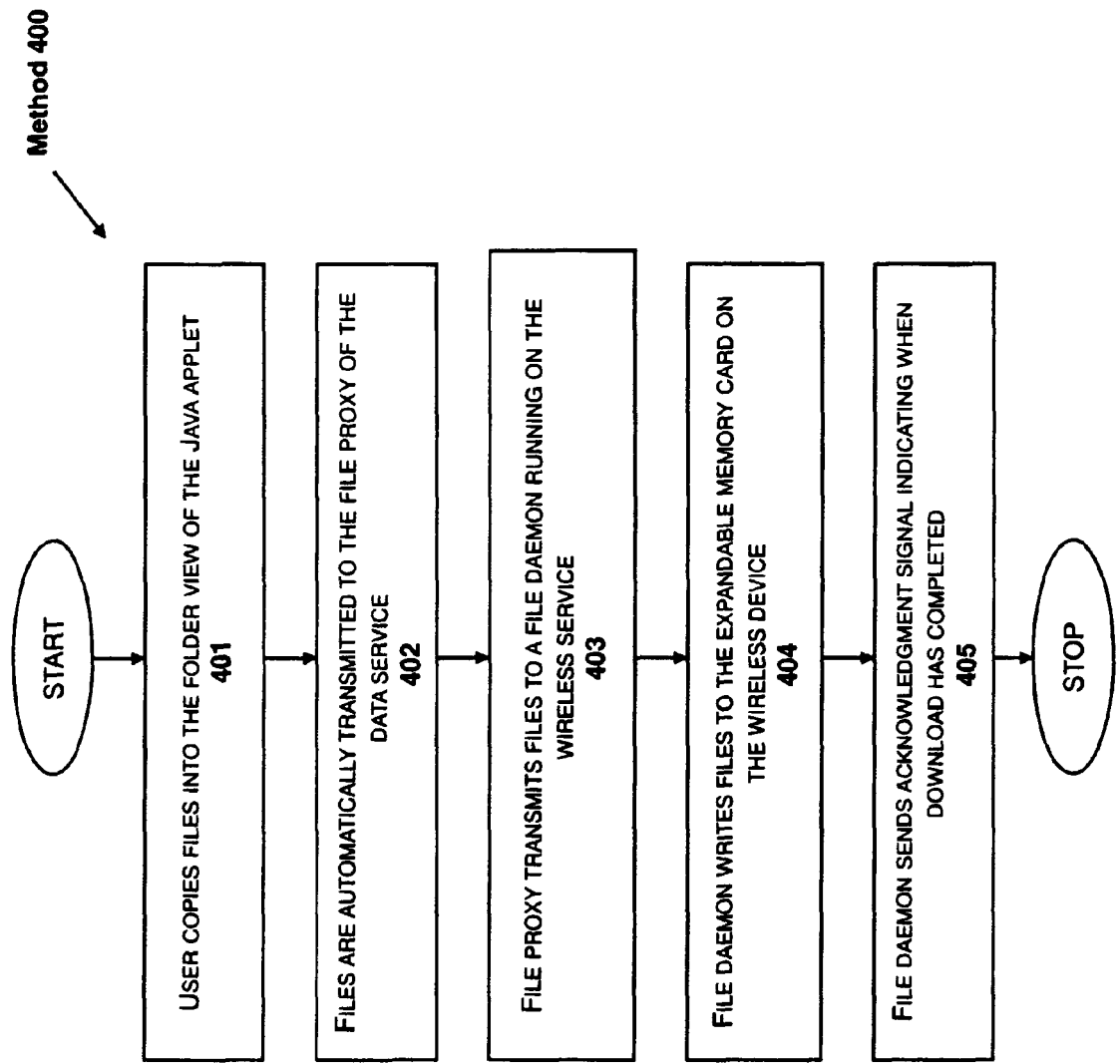
FIG. 4 illustrates a method of wirelessly copying files from an application on a user's computer desktop onto an expandable memory in a wireless device according to one embodiment.

A process according to one embodiment, is illustrated in method 400 of FIG. 4. In one embodiment, the method shown in FIG. 4 is executed within the context of the adapter-based architecture shown in FIG. 3*b*. However, this particular architecture is not required for implementing the underlying principles of the various embodiments.

At step 401, the user copies or moves files from the user's computer desktop 301 into the folder view of Java applet 303. The copied files are then immediately and automatically transmitted over data network 230 and received by dispatcher 306 of service 100 in step 402. Dispatcher 306 is configured to send and receive information over both data network 230 and wireless network 220. Dispatcher 306 receives the automatically transmitted files from Java applet 303 and forwards them to file proxy module 307 where the files are temporarily stored before they are transmitted to device 110 for storage on expandable memory card 315. File proxy 307, in one embodiment, is a service application that performs the synchronization between the built-in device memory and service 100 as discussed above. Additionally, file proxy 307 is operable to transcode files. Transcoding may be either performed as necessary or as desired by the user. Transcoding files involves changing the formatting or quality of a file without changing the content itself. In some embodiments, transcoding may be performed so that a file may be displayed in such a way as to be compatible with the device with which it is being used. Additionally, a large file may be transcoded to lower quality so that it may be downloaded faster over a wireless network such as wireless network 220. In one embodiment, the transcoding is performed at file Proxy 307. File proxy 307 knows to transcode certain files based on built-in knowledge of the user's particular wireless device. For example, a large MP3 file may be changed to low quality or to a different format that is capable of faster transmission over wireless network 220. In another embodiment, the transcoding may take place at Java applet 303 before it is transmitted to file proxy 307 of service 100. For example, a very large MP3 audio file may be dragged and dropped into the folder view in Java applet 303 where it will be automatically sent to service 100 in a different format chosen in advance to be more compatible with the user's specific model or type of wireless device such as wireless device 110. In either case, however, the files are transcoded to the appropriate format before they are transmitted to wireless device 110 over wireless network 220.

In step 403, File proxy 307 (via dispatcher 306) transmits the files to wireless device 110 via wireless network 220 where they are received at transceiver 311. Transceiver 311 is operable to send and receive information over a wireless network such as wireless network 220. Wireless transceiver 311 is coupled to file daemon module 312 which is always listening for information broadcast from service 100 over wireless network 220. A file daemon, such as file daemon 312, works in the background and is transparent to the user. File daemon 312 is coupled to expandable memory card 315 via expandable memory interface 313. At step 404, when file daemon 312 receives the files transmitted over wireless network 220, file daemon 312 writes the files to expandable memory card 315 via expandable memory interface 313. At step 405, device 310 sends an acknowledgement signal over wireless network 220 to service 100 indicating that downloading is completed. Service 100 receives the acknowledgement signal and transmits the acknowledgement signal to Java applet 303 over data network 230. Once the acknowledgement signal is received by Java applet 303, it may be displayed to the user in various ways. One way, for example, is for Java applet 303 to include a status viewer where the progress of a particular download could be tracked visually by a user. Additionally, wireless device 110 may also include a status viewer (not shown) that shows the progress of information being downloaded onto expandable memory card 315. In other embodiments, wireless device 110 may include a status viewer that includes information such as date and time a particular download completed and whether there were any errors detected in transmission.

In this manner, files desired by the user to be placed on expandable memory card 315 can be done so wirelessly. All a user needs to do is copy the desired files into the folder view of Java applet 303 and the files will be instantly and automatically downloaded (over time) to expandable memory card 315 through service 100. One of the advantages of this process is that there is no need for a user to take expandable memory card 315 out of wireless device 110 and plug it into the user's computer (e.g., through a Universal Serial Bus connection). Another advantage of this approach is that files that used to be prohibitively large for downloading purposes over a wireless network can be accomplished over time without user management. This allows the user to perform other tasks while large files are downloading onto the user's wireless device. For example, just before driving to work, a user may drag a set of audio files (such as MP3 files) from desktop 301 and drop the set of files into the folder view of Java applet 303. In this embodiment, these files will be automatically downloaded onto expandable memory 315 without further user management.

The above process also works in reverse. Files stored on expandable memory card 315 may be downloaded onto the user's desktop 301 by copying desired files from the folder view of Java applet 303 onto desktop 301 (or some other file or folder on desktop 301). In addition, whenever a change is made to the contents of expandable memory 315, a process is initiated to update the folder view of Java applet 303. Whenever files are added, modified or deleted from expandable memory card 315, the folder view of Java applet 303 is updated with to accurately reflect the current contents of expandable memory 315. Likewise, files may be deleted from within the folder view of Java applet 303. As a result, whenever files are copied, modified, or deleted from the folder view of Java applet 303, that file will be added, modified or deleted, respectively, from expandable memory 315 and vice versa so that the folder view in Java applet 303 accurately reflects the data stored on expandable memory card 315.

Figure 5:
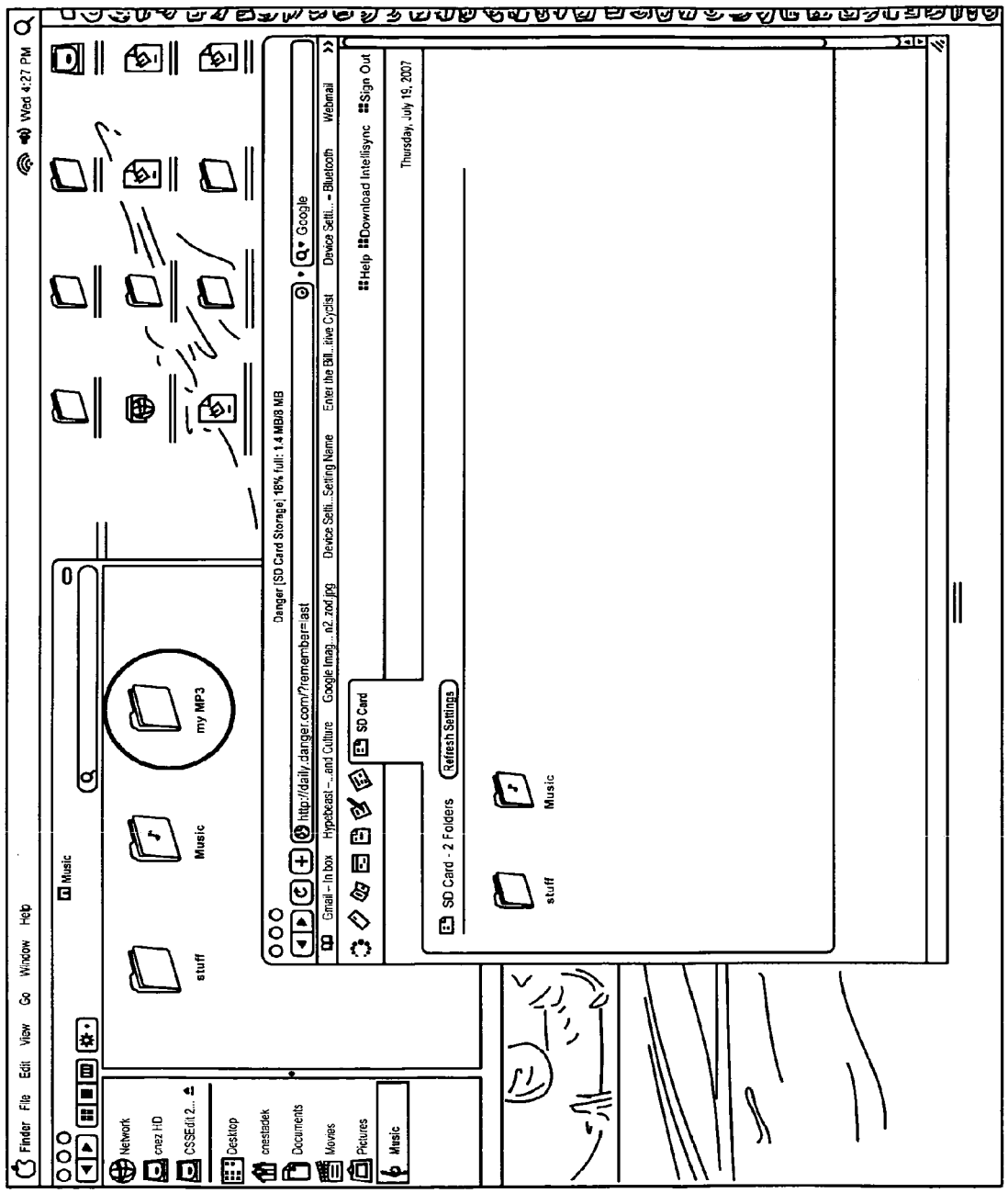
FIGS. 5-8 illustrate a user interface according to one or more embodiments.
Figure 6:
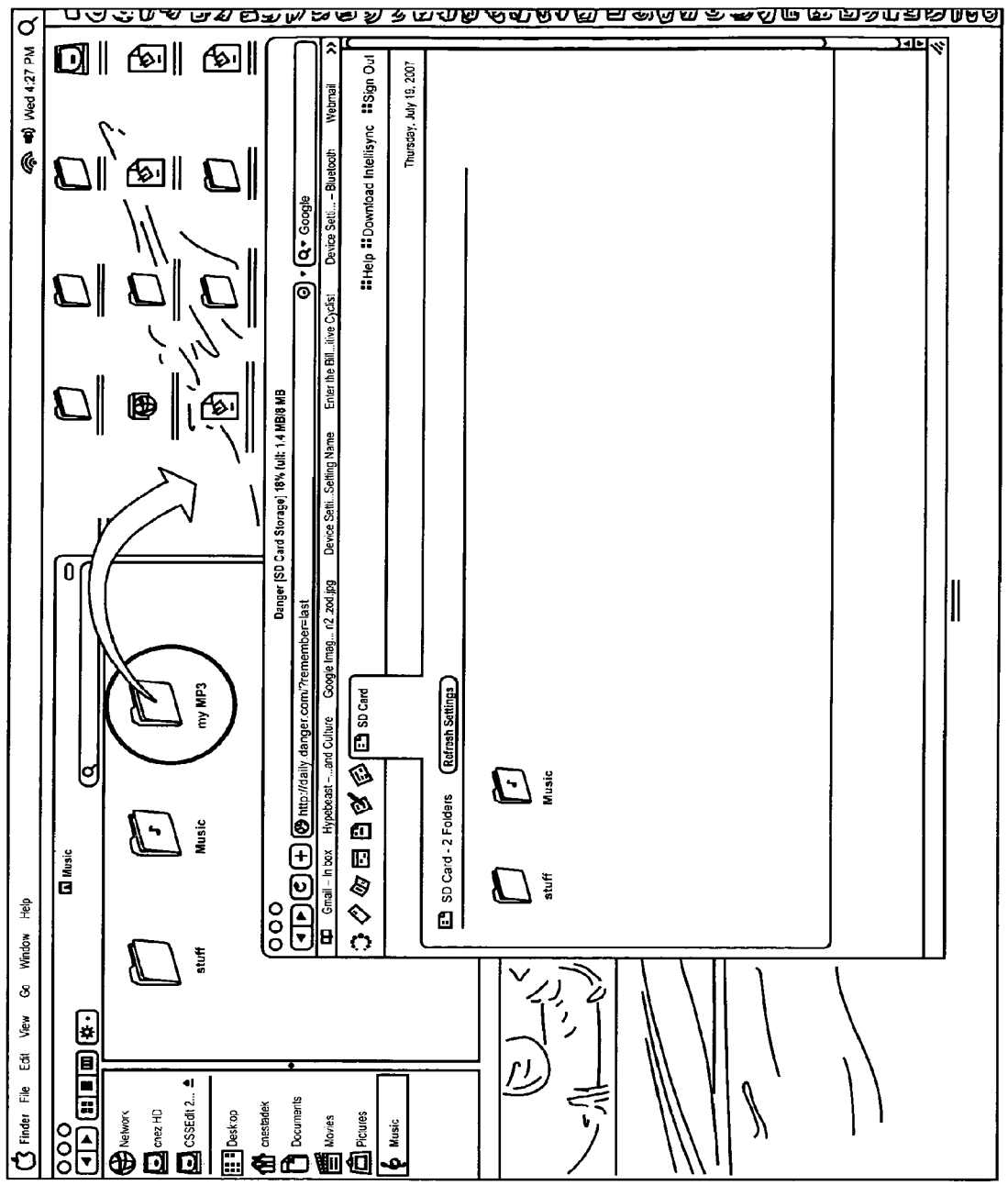
Figure 7:
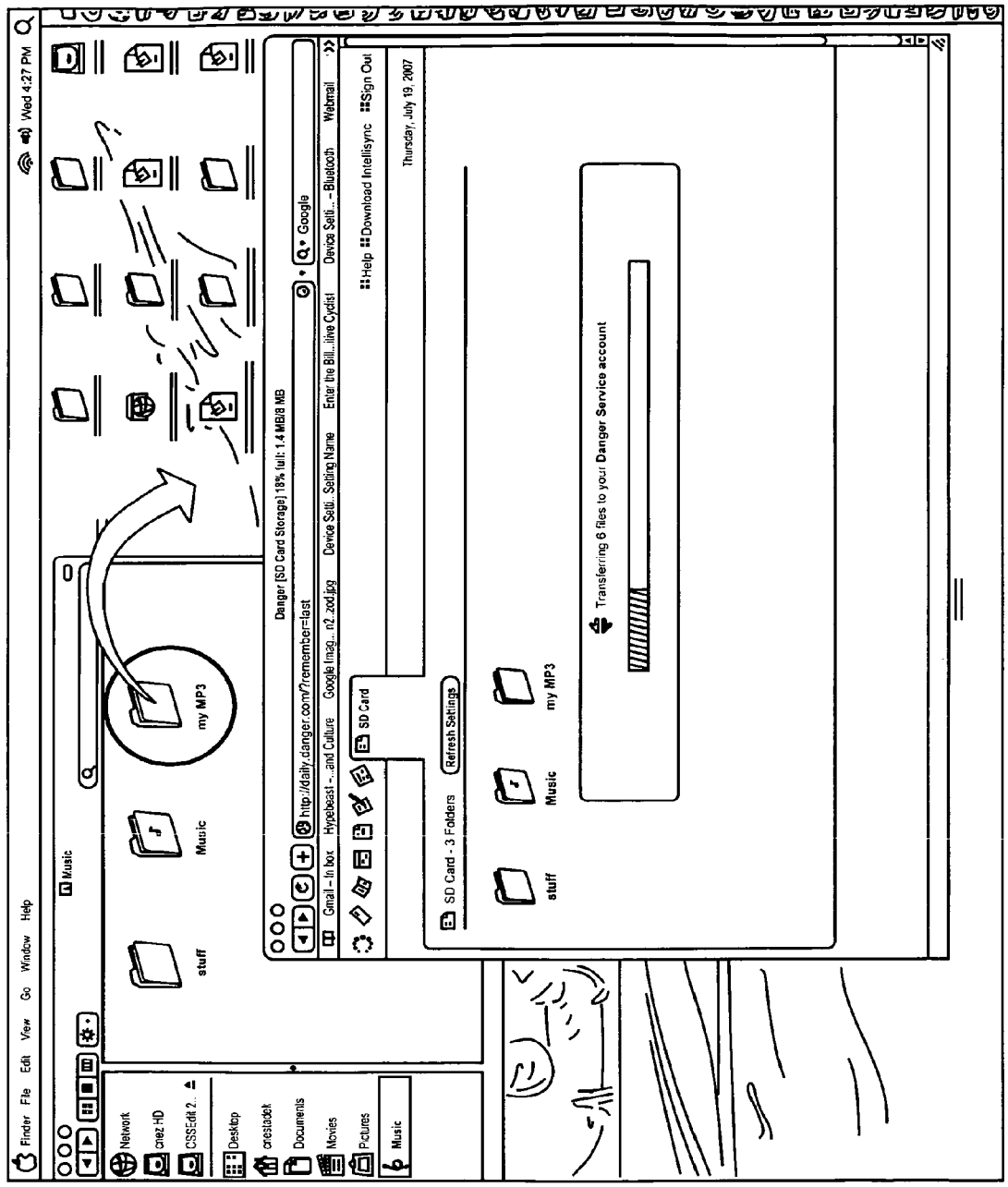
Figure 8:
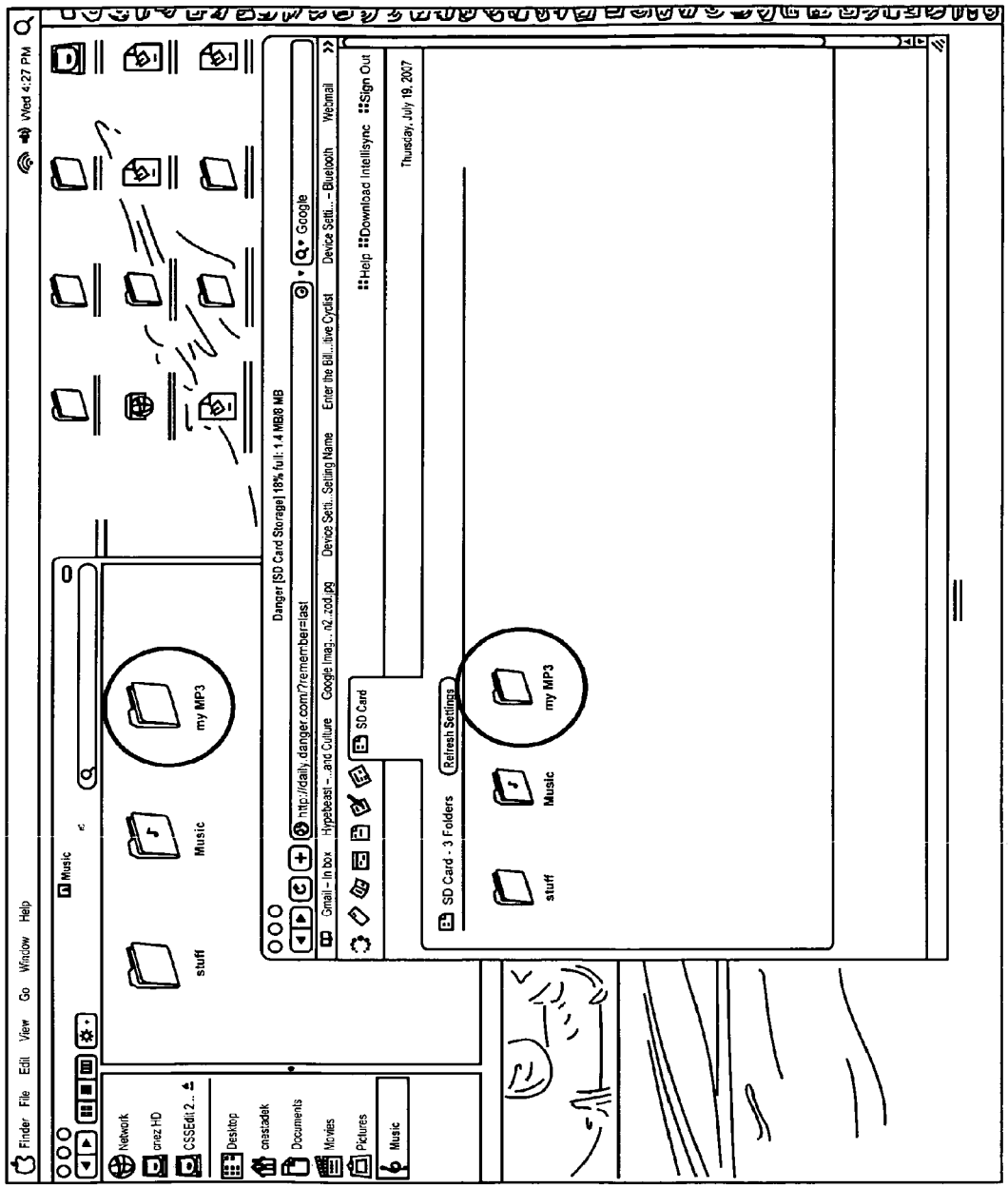

FIGS. 5-8 illustrate an exemplary embodiment of the operation described in FIG. 4. Specifically, FIG. 5 illustrates an exemplary embodiment of the folder view of Java applet 303 in the foreground and an arbitrary file folder on a user's computer desktop in the background. The copying process begins in FIG. 6 where the file, "my MP3," is copied into an exemplary folder view of Java applet 303. The process of copying the file to expandable memory card 315 is immediately initiated as depicted in FIG. 7, which illustrates an exemplary embodiment of the status viewer for tracking the download progress. FIG. 8 illustrates, in an exemplary embodiment, the results of the copying process where the file, "my MP3," which was stored in an arbitrary file location on a user's desktop is now represented in the folder view of Java applet 303 indicating that the file has been downloaded onto and stored within expandable memory 315 of wireless device 110.

Figure 9:
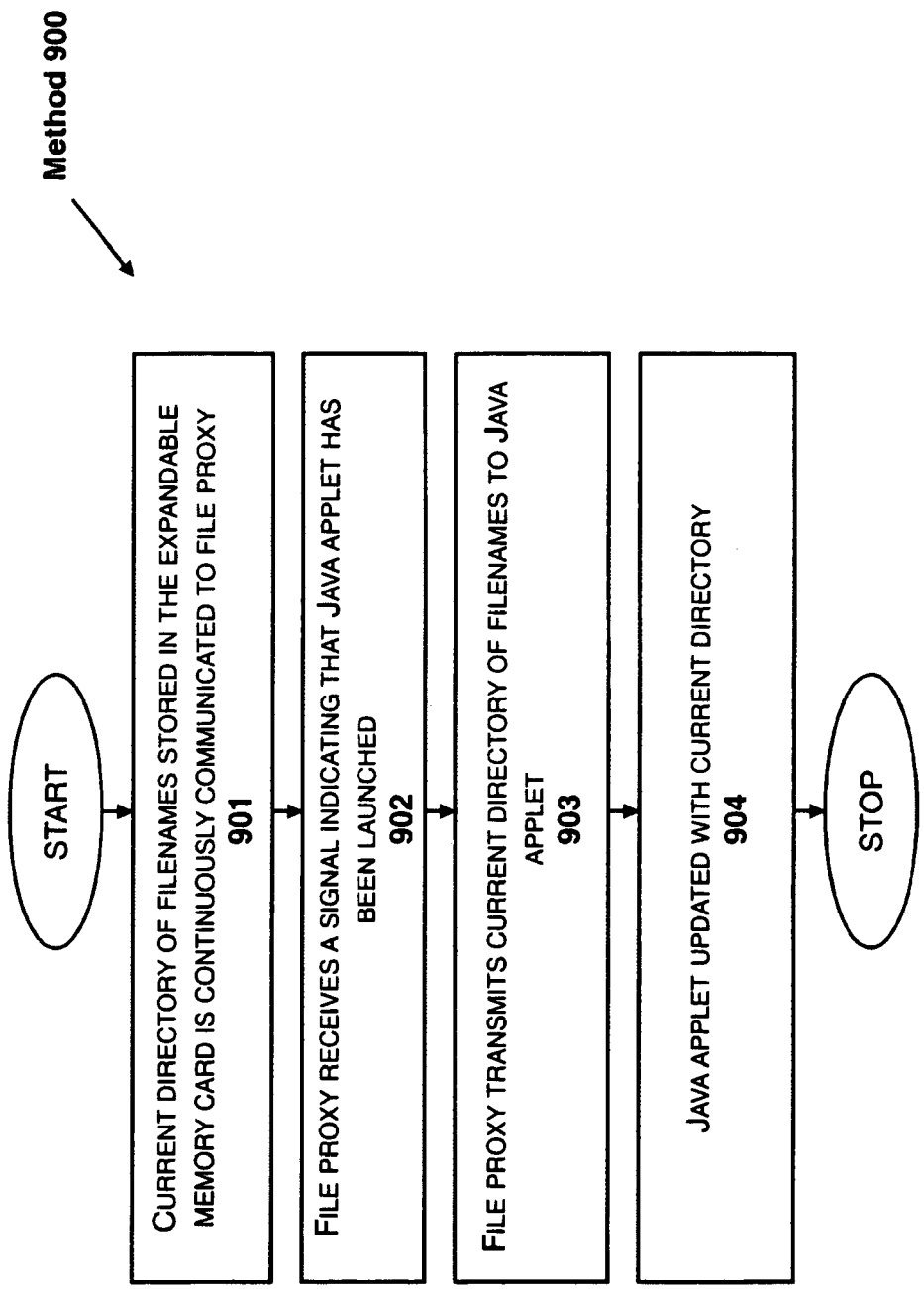
FIG. 9 illustrates a method of copying files from an application on a user's computer desktop with an expandable memory in a wireless device according to one embodiment.

As a result, files contained in the folder view of Java applet 303 are those stored on whatever expandable memory card 315 is currently inserted in wireless device 110. Whenever a user switches to a new expandable memory card, a new folder view is created in Java applet 303. This process, described below, is performed each time Java application 303 is launched or the user switches to a new expandable memory card. Method 900 of FIG. 9 illustrates the process at the time when Java applet 303 is first launched. The current directory of filenames stored on expandable memory card 315 is continuously communicated from device 110 to file proxy 307 of service 100 at step 901. At step 902, whenever Java applet 303 is launched, a signal is automatically sent over data network 230 to file proxy 307 (via dispatcher 306) of service 100. At step 903, when file proxy 307 receives the launch signal from Java applet 303, file proxy 307 the current directory of filenames to Java applet 303. At step 904, Java applet 303 is updated with the current directory of filenames that reflects the data currently stored within the expandable memory card 315 of wireless device 110.

As a result of the above, Java applet 303 is updated with the most recent data stored on expandable memory card 315 every time Java applet 303 is launched. Additionally, service 100 is also notified as to whether expandable memory card 315 is installed, how much memory is currently available, and other relevant information.

In some embodiments, downloading or uploading can be restarted from wherever it left off when there is a disruption in the wireless connection. For example, if a user of wireless device 110 moves to a location out of range of wireless network 220 in the middle of a download/upload, the files will just pick up downloading/uploading where they left off when the user moves back into range. This allows for the seamless downloading of files using Java applet 303 with minimal user involvement and allows prohibitively large files to be downloaded wirelessly without the need for removing expandable memory 315 from wireless device 110.

Embodiments may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

These processes are performed by processing logic that may comprise hardware (circuitry, dedicated logic, etc.), software (such as is run on a general purpose computer system or a dedicated machine), or a combination of both.

Elements of the various embodiments may also be provided as a machine-storage medium for storing the machine-executable instructions. The machine-storage medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. For example, one or more of the claimed embodiments may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of copying data onto an expandable memory. It will be apparent, however, to one skilled in the art that the invention may be practiced without some of these specific details. For example, although the embodiments described above are described with reference to a wireless implementation, the underlying principles of copying data onto an expandable memory may be employed in a variety of different types of networks. Similarly, while the protocol stack described above is implemented using Java, the underlying principles of copying data onto an expandable memory is not limited to any particular programming language.

What is claimed is:

1. A computing device comprising:
an expandable memory interface configured to couple an expandable memory to the computing device;
a transceiver configured to receive, over a network, one or more files that are to be written to the expandable memory;
a file daemon module configured to write the received one or more files to the expandable memory via the expandable memory interface; and the transceiver further configured to:
transmit an acknowledgement signal to an additional computing device over the network when the one or more files are written to the expandable memory, the acknowledgement signal enabling the additional computing device to display a status indicating that the one or more files are written to the expandable memory;
communicate a current directory of filenames corresponding to a current set of files stored on the expandable memory to the additional computing device over the network; and
communicate an indication of an amount of free space remaining on the expandable memory to the additional computing device over the network.

2. The computing device as recited in claim 1, wherein the transceiver is further configured to communicate a current directory of filenames corresponding to one or more additional files stored on an additional expandable memory to the additional computing device over the network responsive to the additional expandable memory being coupled to the computing device.

3. The computing device as recited in claim 1, wherein the file daemon module is configured to run transparent to a user of the computing device.

4. The computing device as recited in claim 1, wherein the computing device comprises a wireless device, and wherein the one or more files are received from a server via a wireless network.

5. The computing device as recited in claim 1, wherein the expandable memory is removable from the wireless device.

6. The computing device as recited in claim 1, wherein the one or more files comprise one or more data files, PDF files, picture files, music files, or video files.

7. A method comprising:
causing display of a folder view on a display of a computing device to enable a user to copy files to an expandable memory coupled to a remote computing device;
receiving a user command to copy one or more of the files into the folder view;
copying the one or more files into the folder view;
responsive to the copying, automatically transmitting the one or more files to a remote server effective to cause the one or more files to be copied into the expandable memory coupled to the remote computing device;
causing display of a status view on the display of the computing device that tracks the copying of the one or more files into the expandable memory coupled to the remote computing device;
receiving an acknowledgement signal when the one or more files have been written to the expandable memory;
receiving a current directory of filenames corresponding to a current set of files stored on the expandable memory; and
receiving an indication of an amount of free space remaining on the expandable memory.

8. The method as recited in claim 7, wherein the expandable memory is removable from the remote computing device.

9. The method as recited in claim 7, wherein the one or more files comprise one or more data files, PDF files, picture files, music files, or video files.

10. A method comprising:
receiving one or more files from a first application running at a first computing device, the one or more files automatically transmitted from the first computing device responsive to being copied into the first application;
automatically transmitting the one or more files to a second computing device to initiate a second application running on the second computing device to write the one or more files onto an expandable memory coupled to the second computing device;
initiating display of a status view on a display of the first computing device that tracks the copying of the one or more files into the expandable memory coupled to the second computing device;
receiving an acknowledgement signal from the second application when the one or more files have been written to the expandable memory;
receiving from the second computing device a current directory of filenames representing a current set of files stored on the expandable memory in the second computing device, and an indication of an amount of free space remaining on the expandable memory; and
transmitting to the first application, the current directory of filenames and the indication of the amount of free space remaining on the expandable memory.

11. The method as recited in claim 10, wherein the expandable memory is removable from the second computing device.

12. The method as recited in claim 10, wherein the one or more files comprise one or more data files, PDF files, picture files, music files, or video files.

13. The method as recited in claim 10, wherein the one or more files are received over a data network and transmitted over a wireless network to the second computing device.

14. The method as recited in claim 10, wherein the first application is a Java applet running within a desktop interface application.

* * * * *